R. HÖGFELDT.
MACHINE FOR MAKING PAPER BOXES.
APPLICATION FILED SEPT. 29, 1909.
1,016,266.
Patented Feb. 6, 1912.
5 SHEETS—SHEET 1.
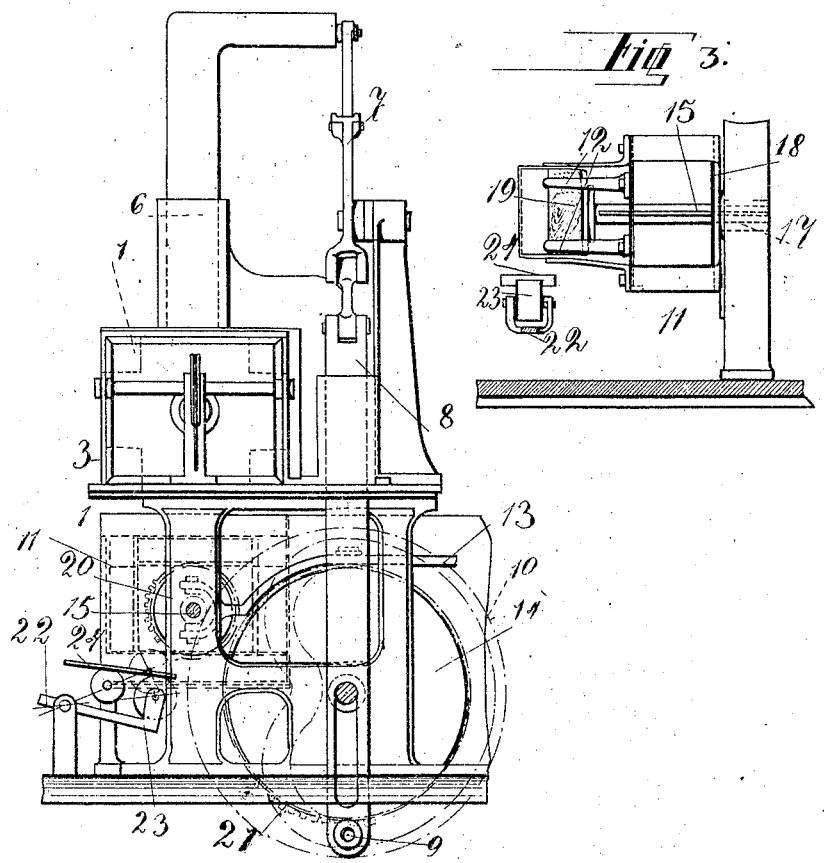

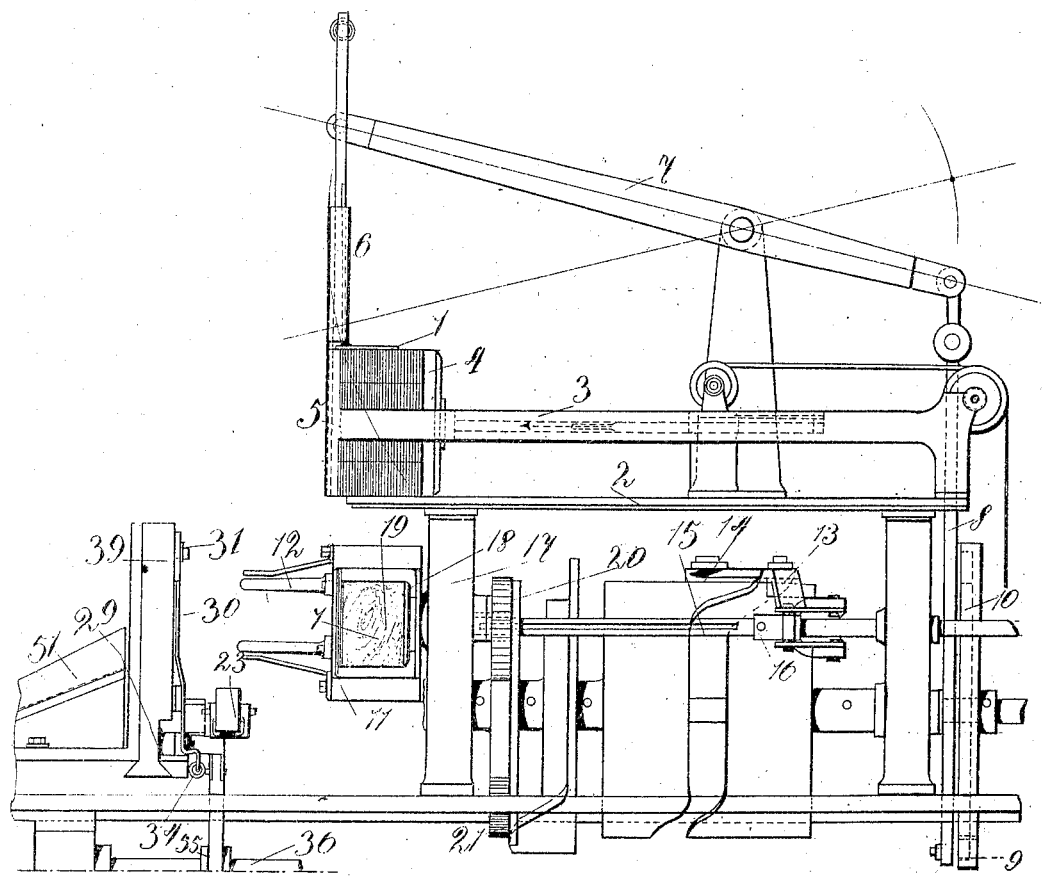

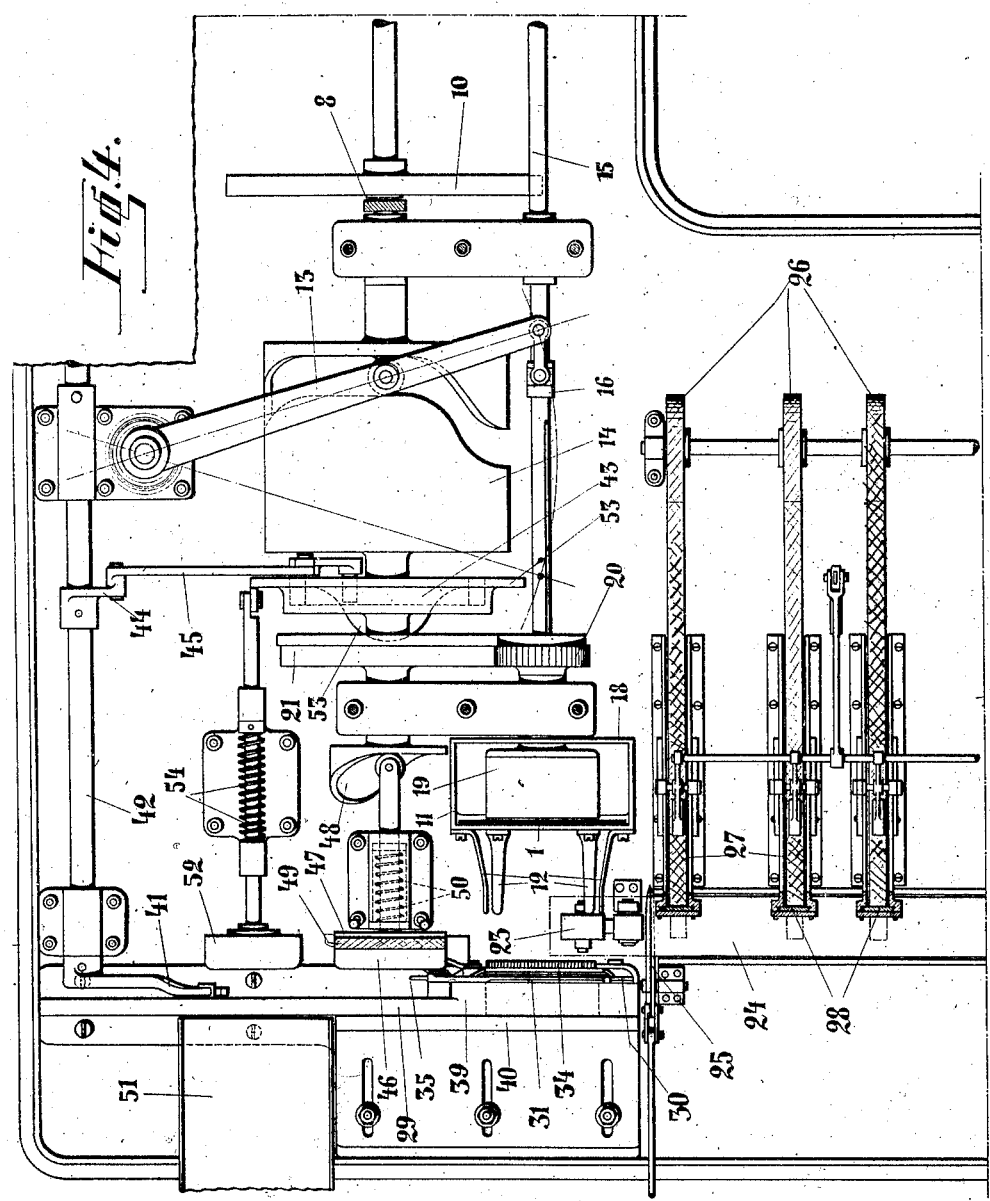

R. HÖGFELDT.
MACHINE FOR MAKING PAPER BOXES.
APPLICATION FILED SEPT. 29, 1909.
1,016,266.
Patented Feb. 6, 1912.
5 SHEETS—SHEET 4.
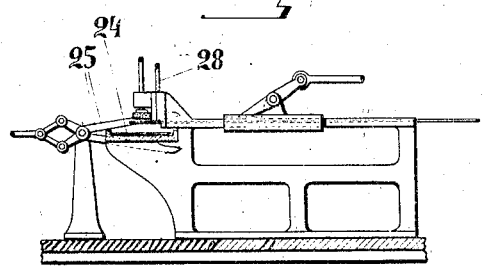
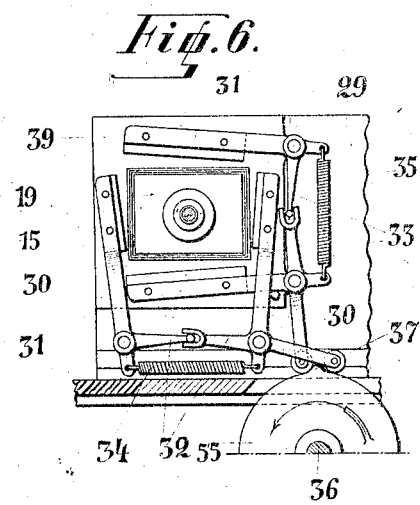
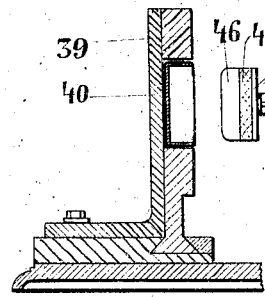
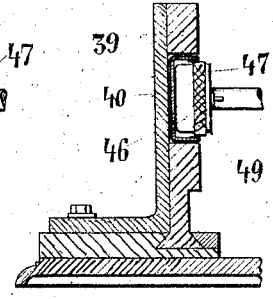
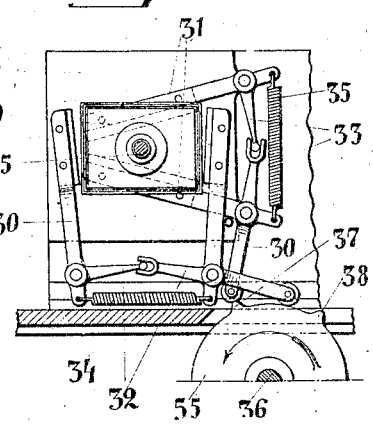

R. HÖGFELDT.
MACHINE FOR MAKING PAPER BOXES.
APPLICATION FILED SEPT. 29, 1909.

1,016,266.

Patented Feb. 6, 1912.

Witnesses:
Arthur E. Zwayer
Daniel Holmgren.

Inventor:
Richard Högfeldt
by his attorney

UNITED STATES PATENT OFFICE.

RICHARD HÖGFELDT, OF DUSSELDORF, GERMANY.

MACHINE FOR MAKING PAPER BOXES.

1,016,266.     Specification of Letters Patent.     Patented Feb. 6, 1912.

Application filed September 29, 1909. Serial No. 520,135.

*To all whom it may concern:*

Be it known that I, RICHARD HÖGFELDT, a citizen of Germany, and a resident of Dusseldorf, Germany, have invented a new and improved Machine for Making Paper Boxes, of which the following is a specification.

This invention relates to a machine for making paper boxes from rectangular blanks cut away at the corners, to form four sides that are scored at the junction with the bottom. The machine first turns up the sides, covers the same with a strip that projects over both ends of the box, turns in such ends, and presses the turned in ends against the bottom and also against the inner side of the box. Means are also provided for attaching to the strip a number of spaced slips that form reinforcements for the box corners.

Figure 14:
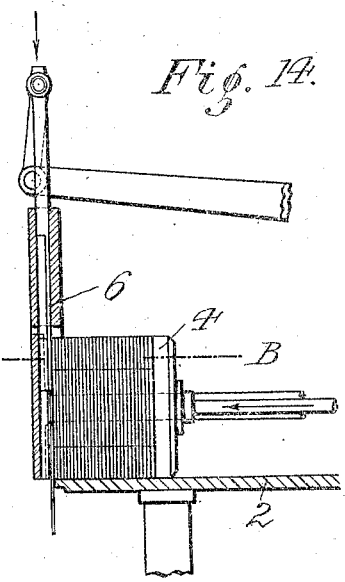
Figure 15:
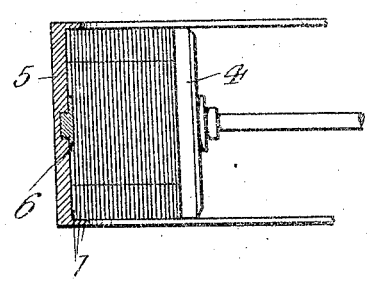

In the accompanying drawing: Figure 1 is a front elevation of a machine embodying my invention; Fig. 2 a side elevation thereof; Fig. 3 a detail of the blank holder, plunger and strip applying roller; Fig. 4 a plan; Fig. 5 a detail of the slip feeder and cutter; Fig. 6 a detail of the strip folding levers; Fig. 7 a similar view showing the parts in a different position; Fig. 8 a detail of the means for pressing the folded strip against the inner side of the box; Fig. 9 a similar view showing the parts in a different position; Figs. 10–13 are details of the plunger operating cam, showing the same in different positions; Fig. 14 a longitudinal section of the blank magazine, and Fig. 15 a cross section on line A—B, Fig. 14.

The properly shaped and scored box blanks 1 are stacked up in an upright position upon table 2 provided with a retaining frame 3. The blanks are pushed by a plunger 4 against a plate 5 between which and the edge of table 2 there is formed a slit of a size to accommodate a single blank. A slide 6 has a rib that engages a corresponding groove of plate 5, and its thickness corresponds substantially to that of the blank, so that it will push the front blank out of the slit during its descent. Slide 6 is actuated from cam 10 by lever 7 and rod 8 having roller 9 engaging said cam, the contour of which is such that a quick down stroke is imparted to the slide. The slide pushes the blank into a box shaped holder or frame 11 of a size to snugly accommodate the same, said holder being furnished at one side with slightly converging spring fingers 12, while a lever 13 located on the opposite side of the holder is provided with a roller 13' engaging a grooved cam 14. Lever 13 is by a link connected to a collar 16 of a rotatable rod 15. Rod 15 turns in bearing 17, and is so connected to a plate 18 of holder 11 that the latter must turn with the rod, while the rod is slidable in the holder. To rod 15 is secured a plunger or core 19, corresponding in size substantially to the interior dimensions of the box to be formed. On rod 15 is mounted a toothed wheel 20 which is rotatable therewith, the rod being however slidable within the wheel. Wheel 20 is engaged by a larger mutilated toothed driving wheel 21, which imparts to wheel 20 complete intermittent rotations. The grooves of cams 10 and 14 are so shaped that immediately upon the lowering of a blank by slide 6, plunger 19 is advanced to turn the scored side-forming flaps of the blank within the holder at right angles (Fig. 3). The displacement of the blank by the plunger is such, that fingers 12 will extend somewhat along the sides of the blank and thus hold the blank against the plunger. The blank will now be located above a roller 23 journaled to a weighted lever 22, and supporting the forward end of the paper or other strip 24 with which the box is to be covered. This strip is either gummed and is then moistened, or it is passed through a suitable gumming device. After the end of the strip arrives between the box and roller 23, scissors 25 will cut off such a length that the ends of the strip when laid around the box will somewhat overlap. This cutting off may also take place after the strip has been nearly pasted to the box, in which case the rear end of the strip is raised off. So also the strip may be cut shortly before the end of the winding operation, which in that case receives a short interruption.

If with larger boxes, the corners are to be reinforced, there are secured to strips 24 at the proper places small textile or other slips. To this effect band spools 26 are mounted on an intermittently rotating shaft, and pass through guides 27, provided with knives 28 (Figs. 4 and 5). The corner forming slips are fed at right angles to strip 24, and when they have advanced with their ends over strip 24, the knives descend, and sever the portions projecting beyond guides 27. As the guides are located directly at the covering strip, and as the gummed side of the latter faces upward, the severed slips will be at once secured at the proper position, and will be pasted to the box simultaneously with the strip. When the strip has sufficiently advanced, the previously mentioned complete rotation of the holder and plunger, together with the box blank projecting beyond fingers 12, will take place. During this rotation, the strip is wound around the box, against which it is pressed by the weighted lever 22, such lever permitting the roller by its play to follow the contour of the box. After a complete rotation of the blank has taken place, it will be intermittently arrested, owing to mutilated wheel 21. Cam 14 will now effect a further advance of plunger 19 together with the blank, and carry the latter to means for folding projecting portions of strip 24. These means consist of a laterally movable slide 29 carrying a number of folding levers 30, 31, (Figs. 6 and 7), which are connected in pairs by rods 32, 33. The levers are so actuated by springs 34, 35, and by an eccentric 55 of shaft 36, that they will be projected over the box bottom and will quickly recede therefrom. In this way the projecting portion of strip 24 will be bent over and pressed against the bottom. In effecting this operation, levers 30 are by nose 37 of disk 55 first projected over the narrow sides of the box, and after such levers have receded, levers 31 are actuated. A still further advance of the blank by the plunger now takes place so that the blank is pushed into a matrix 39 of slide 29, the bottom of which constitutes a fixed slide guide 40. Piston 19 now quickly recedes, and then a second advance of levers 30, 31 through a nose 38 of disk 55 takes place, whereby the portions of strip 24 that project beyond the front edge of the box are turned toward the same (Fig. 8). Slide 29 will now be moved sidewise together with matrix 39, by crank arm 41 and shaft 42 which is rocked from cam 43 by cam lever 45 and crank 44. By the lateral movement of slide 29, the blank is presented to a second plunger 46 which is advanced from cam 48 against action of spring 50. Plunger 46 is secured to a rigid plate 47 by an interposed resilient member 49 formed of rubber or similar material, the exposed rim of member 49 being normally flush with the rims of plunger 46 and plate 47, as clearly illustrated in Fig. 8. When the plunger is projected into the box, it will engage the inwardly turned portion of strip 24 and fold it against the inner faces of the box sides. When the rigid head 46 of the plunger is pressed against the bottom of the matrix, the resilient member 49 will be swelled outward, so that the folded strip is forced tightly against the inner face of the box (Fig. 9). The plunger is now retracted by spring 50, so that the resilient member 49 will contract and recede from the box. A still further lateral movement is now imparted by cam 43 to slide 29 together with matrix 39. This movement will carry the matrix toward a discharge chute 51, opposite to which is located a plunger or ejector 52 operated by cam 53 against action of spring 54. By the advance of this plunger, the box will be pushed into chute 51, as there is no slide guide 40 at this point, after which the operation is completed.

The different parts of the machine are preferably made adjustable and interchangeable, so that the machine is adapted for the manufacture of boxes of different sizes and shapes.

Figure 13:
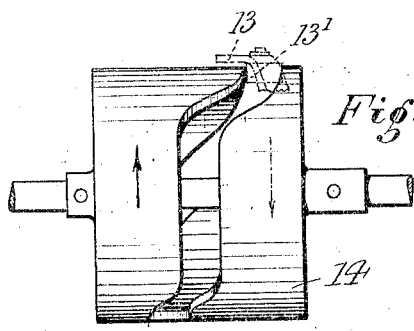
Figure 12:
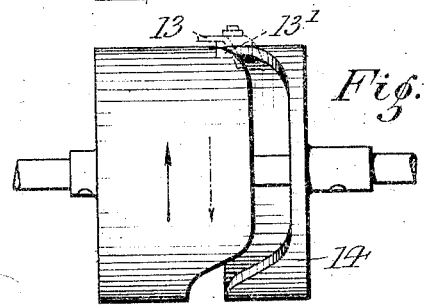
Figure 11:
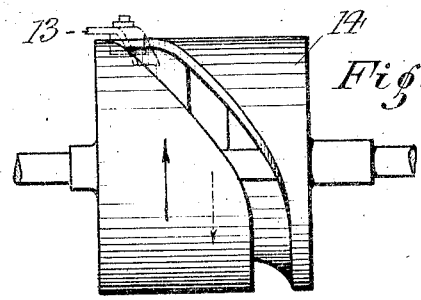
Figure 10:
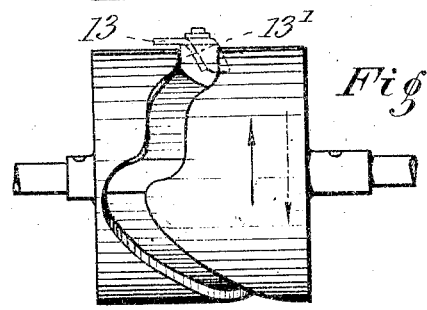

Figs. 10–13 represent consecutive positions of cam 14, each figure showing the cam advanced 90°, while lever 13 with roller 13' is always shown in the same position. By the first partial turn of the cam, the lever is advanced to the position shown in Fig. 10. At the next partial turn, it is twice reciprocated by the duplex undulation of the cam groove (Fig. 11). Then the lever is continuously moved back into the position indicated in Figs. 12 and 13. Thus the lever receives intermittently three forward movements and a single backward movement.

I claim:

1. In a machine of the character described, a rotative frame, an axially slidable core rotatable in unison with the frame and adapted to advance a box blank having side-forming flaps into the frame for folding said flaps against the core, and means for applying a covering strip to the flaps while being held to said core.

2. In a machine of the character described, a rotative frame, an axially slidable core rotatable in unison with the frame and adapted to advance a box blank having side-forming flaps into the frame for upturning said flaps, means on the frame for holding the upturned flaps against the core, and means for applying a covering strip to said flaps.

3. In a machine of the character described, a rotative frame, an axially slidable core rotatable in unison with the frame and adapted to advance a box blank having side-forming flaps into the frame for upturning said flaps, fingers on the frame adapted to hold the upturned flaps against the core, and means for applying a covering strip to said flaps.

4. In a machine of the character described, a rotative frame, an axially slidable core rotatable in unison with the frame and adapted to advance a box blank having side-forming flaps into the frame for upturning said flaps and thereby folding the blank into box form, fingers on the frame for holding the upturned flaps against the core, means for applying a covering strip to the flaps, said strip projecting beyond the box bottom, and means for folding said projecting strip portion against said bottom.

5. In a machine of the character described, a rotative frame, an axially slidable core rotatable in unison with the frame and adapted to advance a box blank having side-forming flaps into the frame for upturning said flaps and thereby folding the blank into box form, fingers on the frame for holding the upturned flaps against the core, means for applying a covering strip to the flaps, said strip projecting beyond the open top of the box, and means for folding said projecting strip portion around said open top.

6. In a machine of the character described, a rotative frame, an axially slidable core rotatable in unison with the frame and adapted to advance a box blank having side-forming flaps into the frame for upturning said flaps and thereby folding the blank into box form, fingers on the frame for holding the upturned flaps against the core, means for applying a covering strip to the flaps, said strip projecting beyond the bottom and open top of the box, a folding device for consecutively folding the projecting strip sections against the box bottom and around the open top respectively, and means for axially displacing the box between said folding operations.

7. In a machine of the character described, means for folding a blank into box form, means for supplying a blank-covering strip, means for simultaneously feeding a plurality of spaced slips transversely across the covering strip, means for detaching the overlying ends of the slips, means for adhesively securing said detached ends to the strip and means for securing the reinforced strip to the folded blank.

8. In a machine of the character described, means for folding a blank into box form, means for surrounding the sides of the box with a covering strip that projects over the open top of the box, means for advancing the covered box into a matrix, a guide way in which said matrix is slidable, means for folding the projecting strip section around the open top of the box, an expansible plunger, means for moving the matrix along the guide way and into axial alinement with said plunger, means for projecting the plunger into the box, and means for removing the box from the matrix.

9. In a machine of the character described, a rotative frame, an axially slidable core rotatable in unison with the frame and adapted to advance a box blank having side-forming flaps into the frame for upturning said flaps and thereby folding the blank into box form, fingers on the frame for holding the upturned flaps against the core, means for applying a covering strip to the flaps, said strip projecting beyond the open top of the box, and a plurality of levers adapted to fold the projecting strip portion around the open top of the box.

10. A machine of the character described, comprising a rotatable blank holder, a number of resilient fingers projecting therefrom, a rotatable and reciprocative plunger coöperating with the holder, and a strip delivery device in proximity to the plunger.

11. A machine of the character described, comprising a rotatable blank holder, a coöperating rotatable and reciprocative plunger, a yieldingly hung strip delivery roller adapted to press the strip against the sides of the blank, a plurality of folding levers adapted to turn protruding portions of the strip against the bottom and over the upper edge of the blank, a second plunger having a resilient section and adapted to press the folded strips against the inner side of the blank, and a slide adapted to convey the strip from the first plunger to the second plunger.

Signed by me at Barmen, Germany, this 14th day of September 1909.

RICHARD HÖGFELDT. [L. S.]

Witnesses:
 REO KÖNIG,
 WILLY KLEIN.